(12) United States Patent
Amaya et al.

(10) Patent No.: US 7,732,114 B2
(45) Date of Patent: Jun. 8, 2010

(54) MODIFIED NIGROSINE, ITS PRODUCTION METHOD, AND TONER FOR DEVELOPING ELECTROSTATIC CHARGE IMAGES USING THIS MODIFIED NIGROSINE

(75) Inventors: Shinji Amaya, Saitama (JP); Toshiro Kogawara, Saitama (JP)

(73) Assignee: Dainippon Ink and Chemicals, Inc., Tokyo (JP)

(*) Notice: Subject to any disclaimer, the term of this patent is extended or adjusted under 35 U.S.C. 154(b) by 444 days.

(21) Appl. No.: 11/663,337

(22) PCT Filed: Sep. 21, 2005

(86) PCT No.: PCT/JP2005/017408

§ 371 (c)(1),
(2), (4) Date: Mar. 21, 2007

(87) PCT Pub. No.: WO2006/035652

PCT Pub. Date: Apr. 6, 2006

(65) Prior Publication Data

US 2007/0264589 A1    Nov. 15, 2007

(30) Foreign Application Priority Data

Sep. 27, 2004    (JP)  .............................. 2004-279236

(51) Int. Cl.
   *G03G 9/097*    (2006.01)
(52) U.S. Cl. .................. 430/108.21; 564/336
(58) Field of Classification Search .................. 430/56, 430/108.21; 564/336
   See application file for complete search history.

(56) References Cited

U.S. PATENT DOCUMENTS 5,019,622 A * 5/1991 Burke et al. ............. 524/532

2003/0186155 A1 * 10/2003 Aoki et al. ................ 430/111.4

FOREIGN PATENT DOCUMENTS

| JP | 53-85605 A | 7/1978 |
|---|---|---|
| JP | 54-49202 A | 4/1979 |
| JP | 6-230611 A | 8/1994 |
| JP | 2001-98202 A | 4/2001 |
| JP | 2002-311652 A | 10/2002 |
| JP | 2003-66654 A | 3/2003 |
| JP | 2003-066654 * | 5/2003 |
| JP | 2003-345067 A | 12/2003 |
| JP | 2004-330456 A | 11/2004 |
| JP | 2004-354797 A | 12/2004 |
| JP | 2006-003681 * | 1/2009 |

OTHER PUBLICATIONS

International Search Report of PCT/JP2005/017408, date of mailing Dec. 6, 2005.
Japanese Office Action on JP 2005-247548 dated Oct. 14, 2008.
Japanese Office Action on JP 2005-247548 dated Mar. 17, 2009.

* cited by examiner

*Primary Examiner*—John L Goodrow
(74) *Attorney, Agent, or Firm*—Westerman, Hattori, Daniels & Adrian, LLP

(57) ABSTRACT

Modified nigrosine which has satisfactory dispersibility in resin and which reduces the residual aniline amount is offered, and its production method is also offered. Moreover, toner for developing electrostatic charge images is offered, which uses modified nigrosine colorant that resolves the aforementioned problems, which has excellent charge-imparting properties, which exhibits no fogging, which experiences no scattering of toner inside the developing apparatus, and which has little fluctuation of image density.

Modified nigrosine, which is nigrosine (b) that has been modified by rosin-modified resin (a) with an acid value of 110 or less.

9 Claims, No Drawings

MODIFIED NIGROSINE, ITS PRODUCTION METHOD, AND TONER FOR DEVELOPING ELECTROSTATIC CHARGE IMAGES USING THIS MODIFIED NIGROSINE

CROSS-REFERENCE TO PRIOR APPLICATION

This application is a U.S. National Phase Application under 35 U.S.C. 371 of International Patent Application No. PCT/JP2005/017408 filed Sep. 21, 2005, and claims the benefit of Japanese Patent Application No. 2004-279236, filed Sep. 27, 2004, both of which are incorporated by reference herein. The International Application was published in Japanese on Apr. 6, 2006 as WO 2006/035652 A1 under PCT article 21(2)

TECHNICAL FIELD

The present invention relates to a modified nigrosine, its production method, and a toner for developing electrostatic charge images using this modified nigrosine.

BACKGROUND ART

As a toner for use in electrophotographic copiers or printers, a positively charged toner is used. As a charge controlling agent in this positively charged toner, one may use nigrosine dye, triphenylmethane dye, quaternary ammonium salt, and so on. However, these positive-charge-imparting charge controlling agents comport many problems. For example, quaternary ammonium salt has a low charge-imparting ability, as a result, toner images using it tend to experience fogging and reduced image density as the number of copy sheets multiplies. Triphenylmethane dye tend to cause reduction in charge quantity if used under conditions of a high temperature and a high humidity, and contamination of the fixing roll occurs due to the fact that the pigment in the toner tends to bleed on the surface.

Nigrosine has high positive-charge-imparting properties, and is an excellent charge controlling agent, but its charging performance, thermal properties and so on are greatly affected by the production method. As a result, problems that impair print quality tend to occur, e.g., dispersibility in toner resin does not stabilize, and fogging, reduced image density, toner scattering and the like occur as copying is repeated.

In order to resolve such problems, an approach has been adopted where nigrosine is modified with high-acid-value resin having an acid value on the order of 130 to 300, and this is added to the positively charged toner as a charge controlling agent. To be sure, nigrosine that has been modified with high-acid-value resin has better dispersibility than non-modified nigrosine in toner resin. However, even with nigrosine that has undergone such treatment, dispersibility in toner resin still does not reach a level that is satisfactory in practical terms, and further improvement is called for.

Nigrosine is a bluish-black or black colorant, and is manufactured by heating aniline and nitrobenzene to 160° C.-180° C. in the presence of ferric chloride, iron and hydrochloric acid to engender their reaction. After the reaction, the aniline and nitrobenzene are neutralized by adding an alkaline aqueous solution to the reaction liquid, and the aniline layer is fractionated. Subsequently, treatment with alkali is conducted to render it base, and washing, filtration, drying and pulverization processes are executed to manufacture the product.

There is residual aniline in the nigrosine manufactured in this way. In gas chromatography analysis by the fusion method, more than 2,000 ppm of aniline is ordinarily detected (with respect to the analytic conditions, see the section entitled "Best mode for carrying out the invention"). Were the residual aniline in the nigrosine to flow out to the environment, not only would it be hazardous, but if the nigrosine were used as the charge controlling agent of the toner, it would also cause the charging performance of the toner to deteriorate, the fluidity of the toner to decrease, and so on. As aniline in excess of 2,000 ppm has been detected even in conventional resin-modified nigrosine, where the nigrosine is modified with high acid value resin, there is a need not only to improve the aforementioned dispersibility, but also to reduce the amount of residual aniline.

Various studies have been conducted on methods for reducing the amount of this residual aniline. For example, as aniline reduction methods for nigrosine, the following methods, among others, are conceivable (e.g., see patent literature 1):

(1) a method which washes and removes nigrosine by an aniline-soluble solution;

(2) a method which adds a solvent with a boiling point of 100-230° C., and which conducts heating and pressure reduction to remove aniline together with the solvent;

(3) a method which conducts removal by heating and pressure reduction;

(4) a method which conducts removal by heating at normal pressure.

Furthermore, there is another method where nigrosine manufactured by the normal manufacturing techniques is dispersed in a solvent, oxidation treatment is conducted by adding an oxidizing agent, and steam distillation is conducted (e.g., see patent literature 2). However, it is difficult to dissolve and remove the residual aniline in the nigrosine by the aforementioned method (1), while with the other methods that require heating, the nigrosine undergoes re-aggregation and forms hard particles, as a result, dispersibility in toner resin markedly deteriorates.

Patent literature 1: Japanese Unexamined Patent Application, First Publication No. H6-230611 (25th paragraph)

Patent literature 2: Japanese Unexamined Patent Application, First Publication No. 2002-311652 (24th paragraph)

DISCLOSURE OF INVENTION

Accordingly, the object of the present invention is to provide modified nigrosine which has a high degree of environmental safety, and which—when used as a charge controlling agent for toner—is able to exhibit satisfactory dispersibility in toner resin, and satisfactory charge-imparting performance and fluidity to the toner, as well as its production method. Moreover, another object of the present invention is to provide toner for developing electrostatic charge images which uses modified nigrosine that resolves the aforementioned problems, and the toner has excellent charge-imparting properties, exhibits no fogging, experiences no scattering of toner inside the developing apparatus, and has little fluctuation of image density.

The present inventors and others have achieved the present invention as a result of intensive research aimed at resolving the aforementioned problems in light of these circumstances. That is, the present invention provides modified nigrosine which is nigrosine (b) that is modified by rosin-modified resin (a) having an acid value of 110 or less. It is preferable that the acid value of the rosin-modified resin (a) be 80 or less, more preferable that it be 60 or less, and still more preferable that it be 40 or less.

Moreover, the present invention provides toner for developing electrostatic charge images which contains the aforementioned modified nigrosine.

Moreover, the present invention provides a method of manufacturing modified nigrosine including the steps of: a first step which manufactures a mixed solution of nigrosine (b) and rosin-modified resin (a) by dispersing or dissolving the aforementioned nigrosine (b) in an organic solvent solution of the aforementioned rosin-modified resin (a) that has an acid value of 110 or less; a second step which produces modified nigrosine wherein the aforementioned nigrosine (b) has been modified by the aforementioned rosin-modified resin (a) by mixing the aforementioned mixed solution with water; and a third step which filters the aforementioned modified nigrosine.

In order to resolve the aforementioned problems, at the start of their studies, the present inventors and others attempted to remove the residual aniline in nigrosine by various methods, such as treatment methods where nigrosine modified by rosin-modified maleic resin of high acid value is subjected to pressure reduction treatment at high temperature, dissolved in solvent, and subsequently subjected to vacuum distillation. However, none of the methods could be adopted, as the amount of residual aniline was not reduced, and dispersibility in toner resin could not be improved. Finally, the present inventors and others discovered that it was possible to obtain modified nigrosine resolving the problems of the present invention by using rosin-modified resin with an acid value of 110 or less, and also by conducting modification of nigrosine by the aforementioned manufacturing processes. The reasons for this are not clear, but may be inferred as follows.

Conventionally, manufacture of modified nigrosine has been conducted by dispersing or dissolving nigrosine and high-acid-value rosin-modified resin in organic solvent solution, and effecting modification by the pertinent resin by mixing the mixed solution with water. In this manufacturing process, it is conjectured that the residual aniline in the nigrosine is eluted in water when the pertinent mixed solution is mixed with water. However, when the rosin-modified resin has a high acid value, it would seem that the residual aniline amount in the nigrosine cannot be adequately reduced, because the residual aniline is trapped in the carboxyl groups of the rosin-modified resin. On the other hand, when the rosin-modified resin has a low acid value, the residual aniline is difficult to trap. Consequently, it would seem that a considerable amount is eluted in water, whereby reduction of the residual aniline is able to be accomplished.

Ordinarily, resin with an acid value of 20 or less is used as toner resin. The modified nigrosine of the present invention is modified by low-acid-value rosin-modified resin with an acid value of 110 or less. It is inferred that it is for this reason that the modified nigrosine of the present invention has satisfactory compatibility with toner resin compared to modified nigrosine which is modified by conventional high-acid-value rosin-modified resin having an acid value of 130 to 300. It would seem that, as a result, the modified nigrosine of the present invention has satisfactory dispersibility in toner resin.

EFFECTS OF THE INVENTION

As the modified nigrosine of the present invention has satisfactory dispersibility relative to resin, and as the residual aniline amount is reduced as much as possible, it is suited for use as a charge controlling agent for toner. Toner using the modified nigrosine of the present invention constitutes toner for developing electrostatic charge images which has excellent charge-imparting properties, exhibits no fogging, experiences no scattering of toner inside the developing apparatus, and has little fluctuation of image density. Furthermore, as treatment is conducted with low acid value resin, the hygroscopicity of the toner is suppressed, and its environmental stability is satisfactory. In addition, it enables the amount of aniline that volatizes during copier and printer use to be reduced to the utmost, and it is very useful from such standpoints as toxicity and odor problems.

BEST MODE FOR CARRYING OUT THE INVENTION

Preferred examples of the present invention are described below with reference to drawings. However, the present invention is not limited by any of the below examples, and, for example, the constituent elements of these examples may be appropriately combined.

The modified nigrosine of the present invention is obtained from modifying nigrosine (b) (nigrosine base)—manufactured by the ordinary methods—by rosin-modified resin (a) with an acid value of 110 or less. As for the product mode of the modified nigrosine of the present invention, a paste containing moisture is acceptable, but it is preferable to have a solid product mode in a granular or powder condition that has undergone a drying process.

As the rosin-modified resin (a) with an acid value of 110 or less, one may use resins that are public knowledge. Specifically, there is rosin-modified maleic resin, rosin-modified fumaric resin, and rosin-modified phenolic resin, as well as ethylene glycol ester, pentaerythrit ester, and glycerine ester of resin, among others. Of these, it is preferable to use rosin-modified maleic resin and rosin-modified fumaric resin, and rosin-modified maleic resin is more preferable.

As the rosin components of the rosin-modified resin (a), one may cite wood rosin, gum rosin, and tall oil rosin whose main components are abietic acid, dehydroabietic acid, neoabietic acid, parastoric acid, fumaric acid, and isofumaric acid. Rosin-modified maleic resin is alkyd resin wherein polyvalent alcohol such as glycerine, pentaerythrit and ethylene glycol has been made to react with the addition product from the Diels-Alder reaction of these rosins and maleic acid, and the acid value is determined by the blending proportion of the polyvalent alcohol that reacts with the addition product of the rosin and the maleic acid, and also by the degree of esterification. Apart from polyvalent alcohol, one may also use in combination polybasic acid, and form a structure where long-chain alkyd resin binds with the rosin skeleton.

As polyvalent alcohol that reacts with the addition product of rosin and maleic acid, one may cite ethylene glycol, diethylene glycol, propylene glycol, dipropylene glycol, tripropylene glycol, trimethylolpropane, glycerine, pentaerythritol, sorbitol, and so on. As the polybasic acid used as a raw material of the alkyd resin together with these polyvalent alcohols, one may cite phthalic anhydride, terephthalic acid, isophthalic acid, adipic acid, maleic acid, itaconic acid, succinic acid, sebacic acid, and so on.

Moreover, one may also, for example, use a compound having a carbon-carbon unsaturated double bond as raw material of the aforementioned alkyd resin, cause styrene monomer to react with this, and produce rosin-modified styrene maleic resin.

As commercial products of rosin-modified maleic resin with an acid value of 110 or less that may be used in the present invention, there is Markide No. 1, Markide No. 2, Markide No. 5, Markide No. 6, Markide No. 8 and Markide No. 3002 (the above are manufactured by Arakawa Chemical Industries Co., Ltd.), as well as Tespol 1101-1107 and Tespol 1161 (the above are manufactured by Toyo Chemicals Co., Ltd.), among others.

As the acid value of the rosin-modified resin (a), 80 or less is preferable, 60 or less is more preferable, and 40 or less is particularly preferable. When the acid value is in the aforementioned range, the dispersibility of the modified nigrosine is satisfactory, and the residual aniline amount can be reduced more.

Moreover, as the mass ratio of the rosin-modified resin (a) with an acid value of 110 or less and the nigrosine (b) in the modified nigrosine of the present invention, it is preferable that (a)/(b) be 20/80 to 60/40, and more preferable that it be 30/70 to 60/40. Within this range, 35/65 to 55/45 is particularly preferable.

It is preferable that the mass proportion of the aniline contained in the modified nigrosine of the present invention be 1,000 ppm or less. In this patent specification, the mass proportion of aniline signifies the mass proportion of the mass of the aniline contained in the modified nigrosine and the mass of the net nigrosine (b) contained in the modified nigrosine. The mass of the aniline contained in the modified nigrosine is obtained by gas chromatography analysis by the dissolution method. The mass proportion of aniline in the modified nigrosine of the present invention is 1,000 ppm or less, but 900 ppm or less is preferable, and 600 ppm or less is more preferable.

By setting the amount of aniline contained in the modified nigrosine within the aforementioned range, not only is environmental safety enhanced, but in the case of use as a charge controlling agent for toner, dispersibility in the toner resin is satisfactory, the charge-imparting performance of the toner is satisfactory, there is little fluctuation in the amount of charge-imparting when printing large numbers of copies, and the occurrence of fogging can also be suppressed.

As for the softening point of the rosin-modified resin (a), 90° C.-130° C. is preferable, and 95° C.-120° C. is more preferable. Furthermore, with respect to the weight-average molecular weight of the rosin-modified resin (a), 1500-10,000 is preferable, and 2000-10,000 is more preferable. As for number-average molecular weight, 1000-5000 is preferable, and 1000-3000 is more preferable. By setting the weight-average molecular weight and number-average molecular weight within the aforementioned ranges, the dispersibility of the modified nigrosine in toner resin becomes satisfactory, and the amount of residual aniline in the nigrosine (b) at the time of manufacture of the modified nigrosine can be reduced.

The measurement methods for the aforementioned physical properties values in the present patent specification are shown below.

<Measurement Method for Acid Value>

2 g of a specimen material are put into a 100 ml triangular flask, and precisely weighed to the last two digits; 40 ml of a mixed solvent of ethanol:toluene=1:2 (volume ratio) are added, and dissolved. A phenolphthalein solution is used as the indicator, and titrated with a 0.5 normal KOH aqueous solution. The point at which the light red color has not disappeared after 30 seconds is taken as the termination point, and the acid value is calculated.

<Measurement Method for Softening Point>

Measurement is conducted according to the ring-and-ball type softening point measurement method recorded in JIS K 5601-2-2 (of the year 1999). The rate of temperature increase is set to 5° C./min.

<Measurement Method for the Mass Proportion of Aniline by Gas Chromatography Analysis by the Sample Dissolution Method>

(1) The mass proportion of net nigrosine (b) in the modified nigrosine is obtained. It is assumed that the modified nigrosine contains N % of nigrosine (b).

(2) W mg of modified nigrosine is precisely weighed (to one digit after the decimal point) in a 10 cc measuring flask so that net nigrosine (b) becomes 100.0 mg, 2 ml of a solvent (methanol/toluene=1/1 (mass ratio)) is added, and dissolved with vigorous shaking. Subsequently, a solvent (methanol/toluene=1/1 (mass ratio)) is precisely added until the 10 cc scale mark of a 10 cc flask.

(3) After 10 minutes have elapsed, precisely 1.0 μl of the solution is introduced into a gas chromatography (GC), and the mass of the eluted aniline is quantified by the absolute calibration method from the obtained data.

It is assumed here that X mg (a value obtained by the absolute calibration method: to the fourth digit or more after the decimal point) of aniline is eluted from the W mg of modified nigrosine.

(4) The mass proportion C (ppm) of aniline relative to the mass of nigrosine (b) contained in the modified nigrosine is obtained by the following formula.

$$C(\text{ppm}) = \frac{X}{W \times N \times 10^{-2}} \times 10^6 = \frac{X}{W \times N} \times 10^8 \quad \text{(Formula 1)}$$

The GC measurement conditions are recorded below.

Model: Shimadzu Corporation: GC-14A

Column: Shimadzu Corporation: CBP-10 50 m×0.33 mm 0.5 μm film thickness

Carrier gas flow rate: He 1.2 ml/min

Split ratio: 1/20

Column temperature: After being left at 80° C. for 10 minutes, the temperature was raised at 3° C./min up to 150° C.; thereafter, the temperature was raised at 20° C./min up to 240° C., and was left at 240° C. for 30 minutes Injection port temperature: 210° C.

Detection temperature: 250° C.

Range (sensitivity): 10° C.

Sample injection amount: 1 μl

<Measurement Method of Average Molecular Weight>

Tetrahydrofuran (THF) was added to the specimen, and left standing for 12 hours. Subsequently, the THF solution of the specimen was filtered, and the molecular weight of the specimen dissolved in the filtrate was measured. Measurement was by the gel permeation chromatography (GPC) method, and molecular weight was calculated from the calibration curve produced by standard polystyrene.

| | |
|---|---|
| GPC apparatus: | HLC-8120GPC manufactured by Toso Co., Ltd. |
| Column: | TSK Guardcolumn manufactured by Toso Co., Ltd. Triple linkage of Super H-HT/SK-GEL/SuperHM-M |
| Flow rate: | 1.0 ml/min (THF) |

The modified nigrosine of the present invention is manufactured by conducting the following processes in sequence.

First step: a mixed solution of nigrosine (b) and rosin-modified resin (a) that has an acid value of 110 or less is manufactured by dispersing or dissolving the aforementioned nigrosine (b) in an organic solvent solution of the aforementioned rosin-modified resin (a).

Second step: modified nigrosine is produced by mixing the aforementioned mixed solution with water, wherein the aforementioned nigrosine (b) is modified by the aforementioned rosin-modified resin (a).

Third step: the aforementioned modified nigrosine is filtered.

Additionally, the following fourth process is conducted as necessary.

Fourth process: the aforementioned modified nigrosine which has been filtered is dried.

As the organic solvent which is used in the organic solvent solution of the rosin-modified resin (a) having an acid value of 110 or less and which serves to disperse or dissolve the nigrosine (b), there are no particular restrictions so long as the organic solvent can dissolve the aforementioned resin, and can disperse or dissolve the nigrosine (b), but it is preferable to use alcohol organic solvents or ether organic solvents. Specifically, there is ethylene glycol monomethylether, ethylene glycol monoethylether, ethylene glycol monobutylether, propylene glycol monomethylether, ethylene glycol monomethylether acetic ester, ethylene glycol monomethylether acetic ester, and so on. Among these, it is particularly preferable to use propylene glycol monomethylether. When dissolving or dispersing nigrosine (b) in the organic solvent, it is preferable to conduct this by heating, for example, to 60 to 120° C.

After manufacturing the mixed solution of nigrosine (b) and rosin-modified resin (a), the pertinent mixed solution is mixed with water to produce the modified nigrosine. In this case, there are no particular restrictions on the amount of water, but it is preferable to conduct mixing so that the amount of mixed solution and water is in a proportion of 1/1 to 1/5. As for the mixing method, the method of pouring the mixed solution into water of normal temperature is preferable. After the modified nigrosine is produced, it is filtered by the ordinary method, and dried. The modified nigrosine of the present invention is manufactured by such operations, but it is preferable to conduct manufacture so that the mass proportion of aniline is 1,000 ppm or less when the modified nigrosine is analyzed by a dissolution-method gas chromatography under the setting of various conditions.

As regards the nigrosine (b) (nigrosine base) used in the aforementioned production method, one may use nigrosine (b) manufactured by the conventionally known method, that is, by heating aniline and nitrobenzene to 160° C.-180° C. in the presence of ferric chloride, iron and hydrochloric acid so as to cause their reaction. As commercial products of nigrosine base, one may cite Nigrosine Base EE, Nigrosine Base EX, Bontron N-01 and so on, manufactured by Orient Chemical Co., Ltd.

It is preferable that the modified nigrosine of the present invention be used as a charge controlling agent for toner. As regards the usage amount, it is preferable to use 0.1-10 mass % relative to the entire toner composition; 0.5-5 mass % is more preferable, and 0.5-3 mass % is particularly preferable. Within the aforementioned ranges, the required charge-imparting amount can be retained. Converting the aniline amount in the toner into the concentration of volatile aniline detected in head space gas chromatograph analysis, 10 ppm or less is preferable, and 5 ppm or less is more preferable. The mass proportion of the volatile aniline of the toner is unrelated to the proportion of modified nigrosine contained in the toner, and is a value measured by the aforementioned measurement method by sampling 500 mg of toner as a specimen.

The modified nigrosine of the present invention may also be used in combination with known charge controlling agents. As such charge controlling agents, one may cite quaternary ammonium salts, triphenylmethane compounds, imidazole compounds, metallic salt of imidazole compounds, resin containing amino groups, and so on. In certain cases, it may also be used in combination with conventionally known negative charge controlling agents such as monoazo metal salt, alkyl salicylate, boron compounds, and pendant sulfonic acid resins.

As binder resin of the toner, one may use individually—or in mixtures as necessary—single polymers of vinyl monomers, copolymers, polyester, polyurethane, epoxy resin, polyvinyl butyral, rosin, modified rosin, terpene resin, phenol resin, aliphatic or aliphatic hydrocarbon resin, aromatic petroleum resin, haloparaffin, paraffin wax, and so on. Of the foregoing, polyester resin is particularly preferable, and it is preferable that the polyester resin be present at 50 mass % or more relative to the entirety of the resin.

Polyester resin is obtained by dehydrating and condensing dicarboxylic acid and diol, and one may also use in combination as necessary polyvalent alcohol and polyvalent carboxylic acid that is trifunctional or higher.

As the dicarboxylic acid, one may cite, for example, dicarboxylic acid or its derivatives such as phthalic anhydride, terephthalic acid, isophthalic acid, orthophthalic acid, adipic acid, maleic acid, maleic anhydride, fumaric acid, itaconic acid, citraconic acid, phthalic hexahydroanhydride, phthalic tetrahydroanhydride, cyclohexane dicarboxylic acid, succinic acid, malonic acid, glutaric acid, azelaic acid, sebacic acid, As the diol, one may cite, for example, ethylene glycol, diethylene glycol, propylene glycol, dipropylene glycol, tripropylene glycol, butanediol, pentanediol, hexanediol, bisphenol A, polyoxyethylene-(2.0)-2,2-bis(4-hydroxyphenol) propane and its derivatives, polyoxypropylene-(2.0)-2,2-bis(4-hydroxyphenyl) propane, polyoxypropylene-(2.2)-polyoxyethylene-(2.0)-2,2-bis(4-hydroxyphenyl)propane, olioxypropylene-(6)-2,2-bis(4-hydroxyphenyl)propane, polyoxypropylene (2.2)-2,2-bis(4-hydroxyphenyl)propane, polyoxypropylene (2.4)-2,2-bis(4-hydroxyphenyl)propane, polyoxypropylene (3,3)-2,2-bis(4-hydroxyphenyl)propane, polyoxypropylene (3.3)-2,2-bis(4-hydroxyphenyl) propane and its derivatives, and so on.

Furthermore, one may also use, for example, diols such as polyethylene glycol, polypropylene glycol, ethyleneoxide-propyleneoxide random copolymer diol, ethyleneoxide-propyleneoxide block copolymer diol, ethyleneoxide-tetrahydrofuran copolymer diol, and polycaprocactondiol.

Moreover, one may also use in combination as necessary, for example, aromatic carboxylic acids that are trifunctional or higher and their derivatives, such as trimellitic acid, trimellitic anhydride, pyromellitic acid, and pyromellitic anhydride, or polyvalent alcohols that are trifunctional or higher such as sorbitol, 1,2,3,6-hexanetetraol, 1,4-sorbitane, pentaerythritol, 1,2,4-butanetriol, 1,2,5-pentanetriol, glycerine, 2-methylpropanetriol, 2-methyl-1,2,4-butanetriol, trimethylolethane, trimethylolpropane, and 1,3,5-trimethylolbenzene.

Polyester resin can be obtained by conducting a dehydration-condensation reaction or an ester exchange reaction using the aforementioned raw material components in the presence of a catalyst. As the acid value of the polyester resin, 20 or less is preferable, and 10 or less is more preferable.

As polyester resin, use of bridge polyester resin is preferable from the standpoint of its excellent printing durability, and additionally, it is particularly preferable to use bridge polyester resin containing structural units based on a bisphenol-alkyleneoxide addition product from the standpoints of the fixing temperature range and offset resistance temperature.

As regards the colorant used in the toner, as black pigment, one may cite, for example, carbon black, composite oxide of titanium and iron, aniline black and so on, and there are cases where one may also use organic pigments for the purpose of shading adjustment and the like. Moreover, as mold release auxiliary agents for purposes of supplementing the prevention of toner adhesion to the heat roll, one may use synthetic wax such as low molecular weight propylene and polyethylene, natural wax such as carnaba and montan wax, metal soap, and so on. Furthermore, as a fluidity enhancer, one may use inorganic micropowder such as silicon dioxide, titanium oxide, and alumina; materials wherein these undergo surface treatment with a hydrophobizing treatment agent such as silicon oil and a positive-charge transmission agent containing amino groups or the like; resin micropowder; and so on.

As other components, there are cases where metal soaps are used as lubricants, and where celium oxide, silicon carbonate and so on are used as abrasives.

As the production method for the toner, one may use the common manufacturing process where the resin, charge controlling agent, colorant, and mold release agent are fused and mixed, after which fine grinding and classification treatment is conducted to the desired particle size, and where a fluidity enhancer is added as necessary so as to adhere to the toner surface.

Used in combination with a carrier, the manufactured toner may be used as an electrostatic positive-charge developing agent. As the carrier, one may use conventional carriers, for example, metallic powder such as ferrite powder and magnetite powder, or a resin-coated metallic powder where these metallic powders are coated with resin such as acrylic resin, silicon resin, fluororesin. Moreover, it is also possible to use the toner without alteration as a positive-charge developing agent for non-magnetic single-component developing.

EXAMPLES

Below, the present invention is described in further detail using examples and comparative examples.

Example 1

After adding 120 g of propylene glycol monomethylether and 72 g of rosin-modified maleic resin (Markide No. 5 of Arakawa Chemical Industries, Ltd.) with an acid value of 25 to 48 g of commercial nigrosine base (nigrosine that has not undergone rosin modifying; Bontron N-01 with particle size of 10.7 μm (sorbent black 7) manufactured by Orient Chemical Co., Ltd.), stirring is conducted for 1 hour at 90° C. Next, while stirring in 340 L of water, 130 L of the aforementioned mixed solution is introduced at a trickle over a 10 minute period. After stirring for 10-20 minutes, the precipitated crystal product is filtered, and washing and drying are conducted. After drying, pulverization is conducted to obtain modified nigrosine A with a particle size of 10.1 μm.

Example 2

Modified nigrosine B with a particle size of 10.0 μm is obtained by the same method as example 1, except that rosin-modified maleic resin with an acid value of 39 (Markide No. 8, manufactured by Arakawa Chemical Industries, Ltd.) is used, instead of the rosin-modified maleic resin with an acid value of 25 of example 1.

Example 3

Modified nigrosine C with a particle size of 9.8 μm is obtained by the same method as example 1, except that rosin-modified maleic resin with an acid value of 55 is used, instead of the rosin-modified maleic resin with an acid value of 25 of example 1.

Example 4

Modified nigrosine D with a particle size of 9.7 μm is obtained by the same method as example 1, except that rosin-modified maleic resin with an acid value of 100 (Markide No. 3002, manufactured by Arakawa Chemical Industries, Ltd.) is used, instead of the rosin-modified maleic resin with an acid value of 25 of example 1.

Comparative Example 1

Modified nigrosine E with a particle size of 9.9 μm is obtained by the same method as example 1, except that rosin-modified maleic resin with an acid value of 135 (Markide No. 32, manufactured by Arakawa Chemical Industries, Ltd.) is used, instead of the rosin-modified maleic resin with an acid value of 25 of example 1.

Comparative Example 2

Modified nigrosine F with a particle size of 9.7 μm is obtained by the same method as example 1, except that rosin-modified maleic resin with an acid value of 300 (Markide No. 33, manufactured by Arakawa Chemical Industries, Ltd.) is used, instead of the rosin-modified maleic resin with an acid value of 25 of example 1.

Comparative Example 3

Commercial nigrosine base (nigrosine which has not undergone rosin modifying; Bontron N-01 with particle size of 9.7 μm manufactured by Orient Chemical Co., Ltd.) is subjected to heat treatment for 24 hours at 250° C. in a vacuum. The powder that coagulates from the heat treatment is pulverized to obtain nigrosine G with a particle size of 9.9 μm.

Comparative Example 4

Commercial nigrosine base (nigrosine which has not undergone rosin modifying; Bontron N-01 with particle size of 9.7 μm manufactured by Orient Chemical Co., Ltd.) was used as the nigrosine H of comparative example 4.

The aniline concentration in the aforementioned modified nigrosine was measured by sample-dissolution-method gas chromatography analysis. The results are shown in Table 1 along with the properties of the resins used in the modified nigrosine.

TABLE 1

| Modified nigrosine dye | | Employed rosin-modified maleic resin | | | Mass proportion (ppm) of aniline |
|---|---|---|---|---|---|
| | | Acid value | Weight-average molecular weight | Particle size (μm) | |
| Example 1 | A | 19 | 10000 | 10.1 | 427 |
| Example 2 | B | 35 | 3400 | 10.0 | 572 |
| Example 3 | C | 55 | 2000 | 9.8 | 863 |
| Example 4 | D | 100 | 1600 | 9.7 | 979 |
| Comparative example 1 | E | 135 | 1000 | 9.9 | 1284 |
| Comparative example 2 | F | 300 | 450 | 9.7 | 2030 |
| Comparative example 3 | G | — | — | 9.9 | 430 |
| Comparative example 4 | H | — | — | 10.7 | 2058 |

Toner Manufacturing Example 1

Synthesis of Polyester Resin

| | |
|---|---|
| Terephthalic acid | 332 mass parts |
| Isophthalic acid | 332 mass parts |
| Polyoxy propylene (2.2)-2,2-bis (4-hydroxyphenyl) propane | 700 mass parts |
| Trimethylol propane | 80 mass parts |
| Ethylene glycol | 75 mass parts |
| Tetrabutyltitanate | 3 mass parts |

The above mixture was put into a four-neck flask in which an agitator, condenser and thermometer were set, and made to react at normal pressure for 10 hours at 240° C. while removing the water produced by dehydration and condensation under a nitrogen gas air current. Thereafter, the pressure was reduced in sequence, and the reaction continued at 10 mm Hg. The reaction was tracked by the softening point, and the reaction was terminated when the softening point reached 151° C. The softening point of the obtained polymer was 153° C., the acid value was 4, and Tg was 65° C. by the DSC measurement method.

| | |
|---|---|
| Polyester resin | 88.5 mass parts |
| Carbon black (MOGULL manufactured by Cabot Co.) | 6.0 mass parts |
| Carnaba wax (Carnaba wax powder No. 1 manufactured by Nippon Wax) | 3.0 mass parts |
| Modified nigrosine A | 2.5 mass parts |

After thoroughly mixing the aforementioned materials with a Henschel mixer, they were fused and kneaded in a biaxial kneading extruder set at 140° C. The obtained kneaded product (kneaded product B) was cooled, and coarsely ground, after which it was finely ground using a fine grinder using a jet air current. The obtained pulverized product was then classified with an air classifier. As a result, fine powder (toner β) with a weight-average particle size of 9.8 μm was obtained. 0.3 mass parts of fine silica powder (BET specific surface area: 130 m²/g) subjected to hydrophobizing treatment by amino-modified silicone oil were added to 100 mass parts of the obtained toner β, and mixed in a Henschel mixer to manufacture toner α-1 having fine silica powder on the surface of the toner particles.

Toner Manufacturing Example 2

| | |
|---|---|
| Polyester resin | 88.5 mass parts |
| Carbon black (MOGULL manufactured by Cabot Co.) | 6.0 mass parts |
| Carnaba wax (Carnaba wax powder No. 1 manufactured by Nippon Wax) | 3.0 mass parts |
| Modified nigrosine B | 2.5 mass parts |

Using the aforementioned materials, toner α-2 having fine silica powder with volume-average particle size of 9.4 μm was prepared in the same manner as toner manufacturing example 1.

Toner Manufacturing Example 3

| | |
|---|---|
| Polyester resin | 88.5 mass parts |
| Carbon black (MOGULL manufactured by Cabot Co.) | 6.0 mass parts |
| Carnaba wax (Carnaba wax powder No. 1 manufactured by Nippon Wax) | 3.0 mass parts |
| Modified nigrosine C | 2.5 mass parts |

Using the aforementioned materials, toner α-3 having fine silica powder with volume-average particle size of 9.5 μm was prepared in the same manner as toner manufacturing example 1.

Toner Manufacturing Example 4

| | |
|---|---|
| Polyester resin | 88.5 mass parts |
| Carbon black (MOGULL manufactured by Cabot Co.) | 6.0 mass parts |
| Carnaba wax (Carnaba wax powder No. 1 manufactured by Nippon Wax) | 3.0 mass parts |
| Modified nigrosine D | 2.5 mass parts |

Using the aforementioned materials, toner α-4 having fine silica powder with volume-average particle size of 9.5 μm was prepared in the same manner as toner manufacturing example 1.

Toner Manufacturing Example 5

| | |
|---|---|
| Polyester resin | 90.0 mass parts |
| Carbon black | 6.0 mass parts |
| (MOGULL manufactured by Cabot Co.) | |
| Carnaba wax | 3.0 mass parts |
| (Carnaba wax powder No. 1 manufactured by Nippon Wax) | |
| Nigrosine H | 1.0 mass parts |

Using the aforementioned materials where the blending quantity of the nigrosine component was conformed to the example, toner α-5 having fine silica powder with volume-average particle size of 9.6 μm was prepared in the same manner as toner manufacturing example 1.

Toner Manufacturing Example 6

| | |
|---|---|
| Polyester resin | 88.5 mass parts |
| Carbon black | 6.0 mass parts |
| (MOGULL manufactured by Cabot Co.) | |
| Carnaba wax | 3.0 mass parts |
| (Carnaba wax powder No. 1 manufactured by Nippon Wax) | |
| Modified nigrosine E | 2.5 mass parts |

Using the aforementioned materials, toner α-6 having fine silica powder with volume-average particle size of 9.9 μm was prepared in the same manner as toner manufacturing example 1.

Toner Manufacturing Example 7

| | |
|---|---|
| Polyester resin | 88.5 mass parts |
| Carbon black | 6.0 mass parts |
| (MOGULL manufactured by Cabot Co.) | |
| Carnaba wax | 3.0 mass parts |
| (Carnaba wax powder No. 1 manufactured by Nippon Wax) | |
| Modified nigrosine F | 2.5 mass parts |

Using the aforementioned materials, toner α-7 having fine silica powder with volume-average particle size of 9.6 μm was prepared in the same manner as toner manufacturing example 1.

Toner Manufacturing Example 8

| | |
|---|---|
| Polyester resin | 90.0 mass parts |
| Carbon black | 6.0 mass parts |
| (MOGULL manufactured by Cabot Co.) | |
| Carnaba wax | 3.0 mass parts |
| (Carnaba wax powder No. 1 manufactured by Nippon Wax) | |
| Nigrosine G | 1.0 mass parts |

Using the aforementioned materials where the blending quantity of the nigrosine component was conformed to the example, toner α-8 having fine silica powder with volume-average particle size of 9.9 μm was prepared in the same manner as toner manufacturing example 1.

(Dispersion Evaluation)

The respective mixed products of the examples and comparative examples were interposed between glass plates, and spread thinly by a heating press, after which the state of dispersion of the nigrosine was observed with an optical microscope. The results are shown in Table 2.

The concentration of aniline volatilized from the respective toners of the examples and comparative examples was measured in head space gas chromatography analysis. The results are shown in Table 2. The measurement method was as follows.

<Head Space GC Method>

500 mg of toner were put into head space bottle HSS-2A (manufactured by Shimadzu Corporation; 28 ml), and 0.8 ml of the components volatilized from 10 minutes of heating at 190° C. were injected into a gas chromatography (GC) mounting a CBP-10 column (manufactured by Shimadzu Corporation) using helium gas as the carrier gas, and the volatile aniline contained in the gas in the head space bottle was quantified. GC conditions

| | |
|---|---|
| Model: | Shimadzu Corporation: GC-14A |
| Column: | Shimadzu Corporation: CBP-10 50 m × 0.33 mm 0.5 μm film thickness |
| Carrier gas flow rate: | He 1.3 ml/min |
| Split ratio: | 1/40 |
| Column temperature: | After being left at 50° C. for 7 minutes, it was heated to 240° C. at 3° C./min, and left standing at 240° C. for 10 minutes |
| Injection port temperature: | 250° C. |
| Detection temperature: | 270° C. |
| Range (sensitivity): | 10° |
| Sample injection amount: | 0.8 ml |

(Adjustment of Developing Agent)

10 mass parts of the respective toners of the examples and comparative examples having fine silica powder and 90 mass parts of ferrite carrier were respectively measured into polyethylene bottles, the polyethylene bottles were rotated on a ball mill stand, and the toner and carrier were friction mixed to obtain the desired charge-imparting amount (suction method).

(Image Performance Evaluation)

Image testing was conducted on 10,000 continuous copies using copier Z-52 manufactured by Sharp. Image density and scumming were measured using a Macbeth densitometer, and toner charge-imparting amount was measured by the suction method. The results are likewise summarized in Table 2.

TABLE 2

| | Employed nigrosine dye | Initial stage | | | 10,000th copy | | | State of dispersion of nigrosine | Aniline concentration |
|---|---|---|---|---|---|---|---|---|---|
| | | Image density | Fogging | Electrification amount μc/g | Image density | Fogging | Electrification amount μc/g | | |
| Toner manufacturing example 1 | A | 1.41 | 0.05 | 15.7 | 1.38 | 0.07 | 16.4 | ⊙ | 2 |
| Toner manufacturing example 2 | B | 1.43 | 0.06 | 15.1 | 1.36 | 0.09 | 16.7 | ⊙ | 5 |
| Toner manufacturing example 3 | C | 1.41 | 0.06 | 15.5 | 1.33 | 0.09 | 17.0 | ○ | 8 |
| Toner manufacturing example 4 | D | 1.40 | 0.07 | 15.7 | 1.31 | 0.09 | 17.2 | ○ | 9 |
| Toner manufacturing example 5 | H | 1.38 | 0.09 | 16.5 | 1.25 | 0.15 | 18.8 | X | 20 |
| Toner manufacturing example 6 | E | 1.34 | 0.09 | 16.8 | 1.19 | 0.17 | 20.5 | Δ | 15 |
| Toner manufacturing example 7 | F | 1.34 | 0.09 | 16.3 | 1.20 | 0.17 | 20.9 | Δ | 18 |
| Toner manufacturing example 8 | G | 1.39 | 0.08 | 16.7 | 1.27 | 0.20 | 19.7 | X | 2 |

Nigrosine dispersion ⊙: best
○: good
Δ: poor
X: worst

INDUSTRIAL APPLICABILITY

As the modified nigrosine of the present invention has satisfactory dispersion relative to resin, and also reduces to the utmost the residual aniline amount, it is suited for use as a charge controlling agent for toner. Toner using the modified nigrosine of the present invention constitutes toner for developing electrostatic charge images that has excellent charge-imparting performance, exhibits no fogging, experiences no scattering of toner inside the developing apparatus, and has little fluctuation of image density. Furthermore, as it is treated with low-acid-value resin, the hygroscopicity of the toner is suppressed, and environmental stability is satisfactory. In addition, it enables the amount of aniline that volatizes during copier or printer use to be reduced to the utmost, and it is very useful from such standpoints as toxicity and odor problems.

The invention claimed is:

1. A modified nigrosine obtained by modifying a nigrosine (b) by a rosin-modified resin (a) with an acid value of 110 or less, wherein a mass proportion of aniline contained in the modified negrosine is 1,000 ppm or less.

2. The modified nigrosine according to claim 1 wherein the rosin-modified resin (a) is a rosin-modified resin with an acid value of 80 or less.

3. The modified nigrosine according to claim 1 wherein the rosin-modified resin (a) is a rosin-modified resin with an acid value of 60 or less.

4. The modified nigrosine according to claim 1 wherein the rosin-modified resin (a) is a rosin-modified resin with an acid value of 40 or less.

5. The modified nigrosine according to claim 1 wherein the rosin-modified resin (a) is a rosin-modified maleic resin.

6. A toner for developing electrostatic charge images comprising the modified nigrosine according to any one of claims 1 to 5;
   a binder resin; and
   a colorant.

7. A process for producing the modified nigrosine according to claim 1, comprising the steps of:
   producing a mixed solution of the nigrosine (b) and the rosin-modified resin (a) by dispersing or dissolving the nigrosine (b) in an organic solvent solution of the rosin-modified resin (a) with an acid value of 110 or less;
   producing the modified nigrosine by mixing the mixed solution with water, wherein the nigrosine (b) is modified by the rosin-modified resin (a); and
   filtering the modified nigrosine.

8. A charge controlling agent for a toner, which comprises the modified nigrosine according to claim 1.

9. The modified nigrosine according to claim 1, which is obtained by a process comprising the steps of:
   producing a mixed solution of the nigrosine (b) and the rosin-modified resin (a) by dispersing or dissolving the nigrosine (b) in an organic solvent solution of the rosin-modified resin (a) with an acid value of 110 or less;
   producing the modified nigrosine by mixing the mixed solution with water, wherein the nigrosine (b) is modified by the rosin-modified resin (a); and
   filtering the modified nigrosine.

* * * * *